June 19, 1962 C. A. DAVIS 3,039,572
RELEASABLE STRUCTURAL CONNECTOR
Filed Jan. 11, 1961 5 Sheets-Sheet 1

INVENTOR
CLIFFORD A. DAVIS
BY
ATTORNEYS

INVENTOR
CLIFFORD A. DAVIS
ATTORNEYS

June 19, 1962 C. A. DAVIS 3,039,572
RELEASABLE STRUCTURAL CONNECTOR
Filed Jan. 11, 1961 5 Sheets-Sheet 4

INVENTOR
CLIFFORD A. DAVIS
BY
ATTORNEYS

June 19, 1962  C. A. DAVIS  3,039,572
RELEASABLE STRUCTURAL CONNECTOR
Filed Jan. 11, 1961  5 Sheets-Sheet 5
FIG. 7
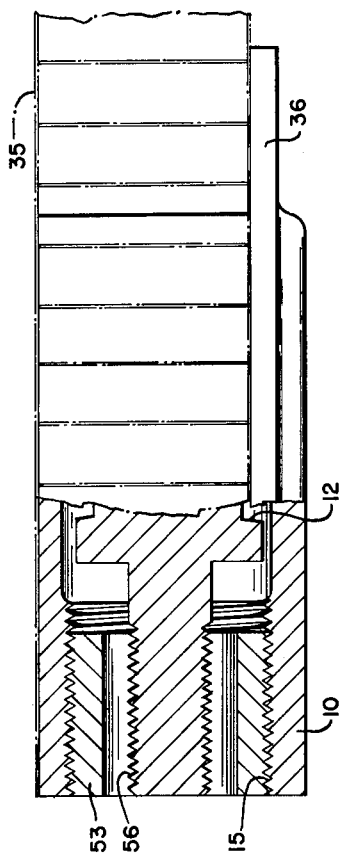
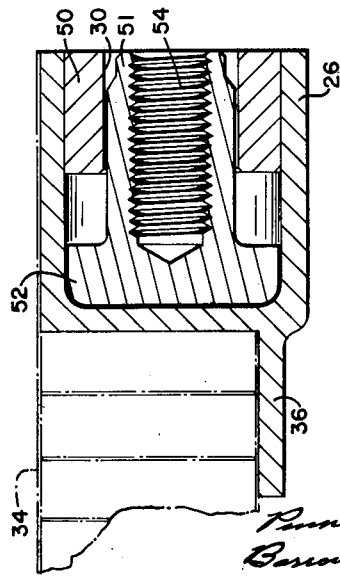
INVENTOR
CLIFFORD A. DAVIS
BY
ATTORNEYS United States Patent Office 3,039,572
Patented June 19, 1962

3,039,572
RELEASABLE STRUCTURAL CONNECTOR
Clifford A. Davis, Sepulveda, Calif., assignor to The Hartwell Corporation, Los Angeles, Calif., a corporation of California
Filed Jan. 11, 1961, Ser. No. 81,967
9 Claims. (Cl. 189—36)

This invention relates to releasable structural connectors or latching devices. More particularly, this invention relates to reliable, fast acting connectors for releasably securing together abutting structural members such as walls, panels or the like, where the connector is an integral load carrying member of the structure in the fastened position.

The advent of structural techniques employing so-called honeycomb members has made it possible to construct walls, panels and the like without necessity for separate frame members such as studs and joists. Common releasable connectors such as bolts and nuts, are particularly troublesome in such structures because no single element in a honeycomb member is strong enough to withstand major load forces which the panel as a whole may be designed to support.

The purpose of this invention is to provide a reliable, releasable structural connector for holding together abutting structural members. While the invention is particularly advantageous for releasably connecting honeycomb structural members, it has broad application as a connector generally and its use is not restricted to honeycomb structures.

A further purpose of this invention is to provide a structural connector which is capable of withstanding severe tension and shear forces without slipping or releasing, even under vibration, but which is easily and quickly releasable under a wide variety of load conditions.

Another purpose is to provide such a connector for installation and operation in the mid-plane or at the neutral axis of structural members which are subjected to bending or flexure. This is highly desirable because the tension stress which a connector must withstand from bending is lowest at such a location. Consequently, size and amount of material in the connector may be minimized. Thus the connector of this invention is particularly advantageous for use in aircraft structures which, as is well known, flex during operation.

Another purpose of this invention is to provide such a connector for flush mounting in the members to be held together. Still another purpose is to provide integral indicating means in the connectors of this invention so that a mechanic can tell at a glance whether the latch-connector is tightly fastened.

This invention also provides a connector with which slightly mismatched members, even though they may be quite inflexible, can be aligned during fastening and with which shear loads acting on the connector can be relieved during unfastening.

In its broad aspects this invention comprises a connector having a bushing unit and a latch bolt unit each adapted for mounting in the abutting regions of two opposing structural members and for mutual threaded engagement. The bushing unit supports a threaded stud so that it is constrained against rotation. The latch bolt unit supports a strong, threaded latch bolt so that it may turn about its axis while being threaded on or off the stud and so that it has limited freedom for axial movement during the threading processes.

An elongate, hollow first helical gear is supported coaxially of the latch bolt to transmit both axial and rotational driving forces to the bolt. A second helical gear or drive wheel is disposed in the bolt unit at an angle to and meshing with the first gear. A very convenient arrangement results when one end of the second gear is accessible at the surface of the members in which the bolt unit is mounted. The end of the second gear may then be internally milled to provide a slot or angular opening to receive a rotating tool such as a screw driver or a suitably shaped wrench for operation. This opening may also be milled to a sufficient depth so that a spring loaded plug can be installed therein. This is a desirable feature where the latch of the invention is intended for flush mounting and where no surface irregularities can be tolerated when the members are fastened together.

The first helical gear is supported in the latch bolt unit on a shaft which has a diameter smaller than an opening at the center of the gear. This provides an annular space between the first gear and the shaft in which a friction drag or brake is inserted.

The friction drag consists of a generally cylindrically shaped spring member arranged to exert inwardly directed forces on the shaft and inhibit relative rotation between the shaft and gear. The drag has two longitudinally extending edges which are crimped radially outward from its cylindrical surface. The drag is mounted around the shaft with each of these edges (or longitudinal ends) projecting into a longitudinal slot cut in the center opening of the first gear.

In this position the drag is stressed against the shaft so that when the second helical gear is turned, rotation of the first gear is resisted by the drag and the axial force component exerted by the second gear moves the first gear slidably along the drag. Then when the latch bolt is forcibly held from axial movement, as when it is fully extended, fully withdrawn or extended so that its threads engage the threads of the stud in an intermediate position, the first gear and the drag turn together about the shaft as a result of the tangential force component, also exerted by the second helical gear, becoming greater than the friction force between the drag and shaft.

Thus, depending on the direction of rotation, the bolt may be turned onto and tightened on the stud-pulling the first gear further along the drag, or turned off of the stud until the stud and bolt are separated—pushing the first gear back along the drag. Following separation, the tangential or torque component is again less than the friction force between the drag and shaft and continued turning of the second gear withdraws the bolt, axially, away from the abutting edges of the structural members, until it is brought up against stops in a recessed enclosure.

In the bushing unit of this invention, the stud is provided with a head portion at its inner end which bears against a block to hold the stud from pulling out under tension. I provide means, such as a rectangular head on the stud and an appropriate rectangular enclosure by which the stud is constrained from rotation so that the bolt may be turned on it. The block is also arranged with an opening at its center which is coaxial with the stud. The diameter of this opening may be made such that the stud and bolt fill it in the fastened position, so that the block, stud and latch bolt together form a rigid unit capable of withstanding heavy shear forces which may be exerted at the joint between the structural members.

To provide for alignment of approximately positioned structural members during fastening, the enclosure for the rectangular stud head may be made slightly oversize so that the stud has limited freedom for radial movement or "play" within the bushing block opening. With an internally threaded bolt, a portion of the end of the bolt is then provided with an outside diameter less than the diameter of the block opening. Threaded engagement between bolt and stud can then be easily initiated even though the structural members are slightly misaligned when their abutting edges are first brought into proximity with each other. In such a position, the bolt and stud are free to align themselves within the block opening. Once threaded together, the latch bolt is drawn axially into the block opening as a result of the jacking action of the threads. With a conical taper of increasing diameter from the reduced diameter end of the bolt, the full diameter portion of the bolt is then drawn into and centered in the block opening. The abutting structural members are thus also aligned, even though they may be relatively rigid and inflexible and may exert heavy shear forces on the bolt during the process.

The alignment feature of this invention is equally advantageous for unfastening when heavy shear stresses remain in the connector. Thus, as the bolt is unthreaded, the two structural members may move relatively within the limits of radial travel in the block opening, as the conical taper portion is withdrawn. By gradually unfastening several connectors around the edges of a bowed panel, for example, the connectors provide for effective shear relief. This feature greatly facilitates final withdrawal of the latch bolts and separation of the structure members when forces remaining between the members place the connectors in shear.

As mentioned, this invention also provides indicator means for giving immediate knowledge, merely by inspection, of the fastened condition of the connector. For this purpose stops are arranged in the latch bolt unit to come into close proximity as the bolt nears the limit of axial travel during fastening. One of the stops remains fixed in the unit and the other travels with the bolt. A spring loaded pin is mounted in the bolt unit adjacent the fixed stop and at right angles to the surface of the member in which the unit is mounted. A clamp is provided around the pin with its ends disposed in the projected area of overlap between the stops. As the stops are brought together when the bolt is fastened, the clamp ends are forced together tightening the clamp around the pin. Then when the pin is intentionally pushed against its spring mount so that its outer end is flush with the surface of the member in which the bolt unit is mounted, the clamp holds it in place as long as the clamp is tight.

If for any reason the bolt is then backed away separating the stops, the clamp releases the pin and the spring loading causes it to pop up so that it projects above the surface of the structure.

This feature is particularly advantageous when, for example, a bowed panel is being brought into alignment by gradual tightening of several connectors. As the mechanic works around the butt joint progressively tightening one connector after another, connectors that have previously been tightened may relax their position as the panel is brought into alignment at other locations. When this occurs the indicator pins pop up and the mechanic can tell, merely by looking back along the joint, that the panel is not yet completely in place and that all connectors are not yet fully fastened.

Details of these and other features of the present invention are described in the following portion of the specifications. Reference will be made to the accompanying drawings in which:

FIG. 7 is a view similar to that of FIG. 3 showing an alternative embodiment according to the invention.

Figure 1:
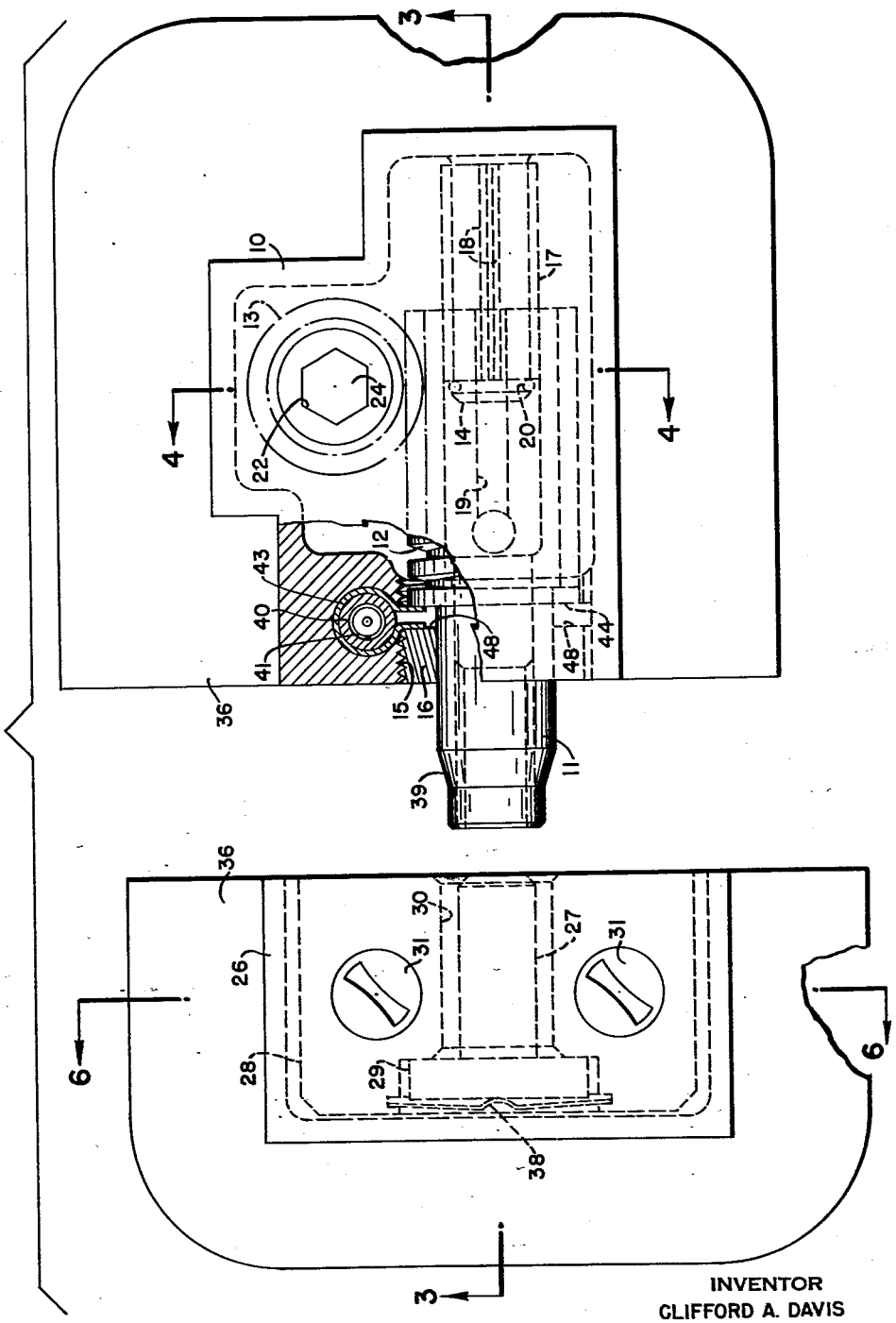
FIG. 1 is a top view, partially in section, of an embodiment according to the present invention showing the latch bolt in the extended position, and the latch bolt and bushing units separated for clarity.
Figure 2:
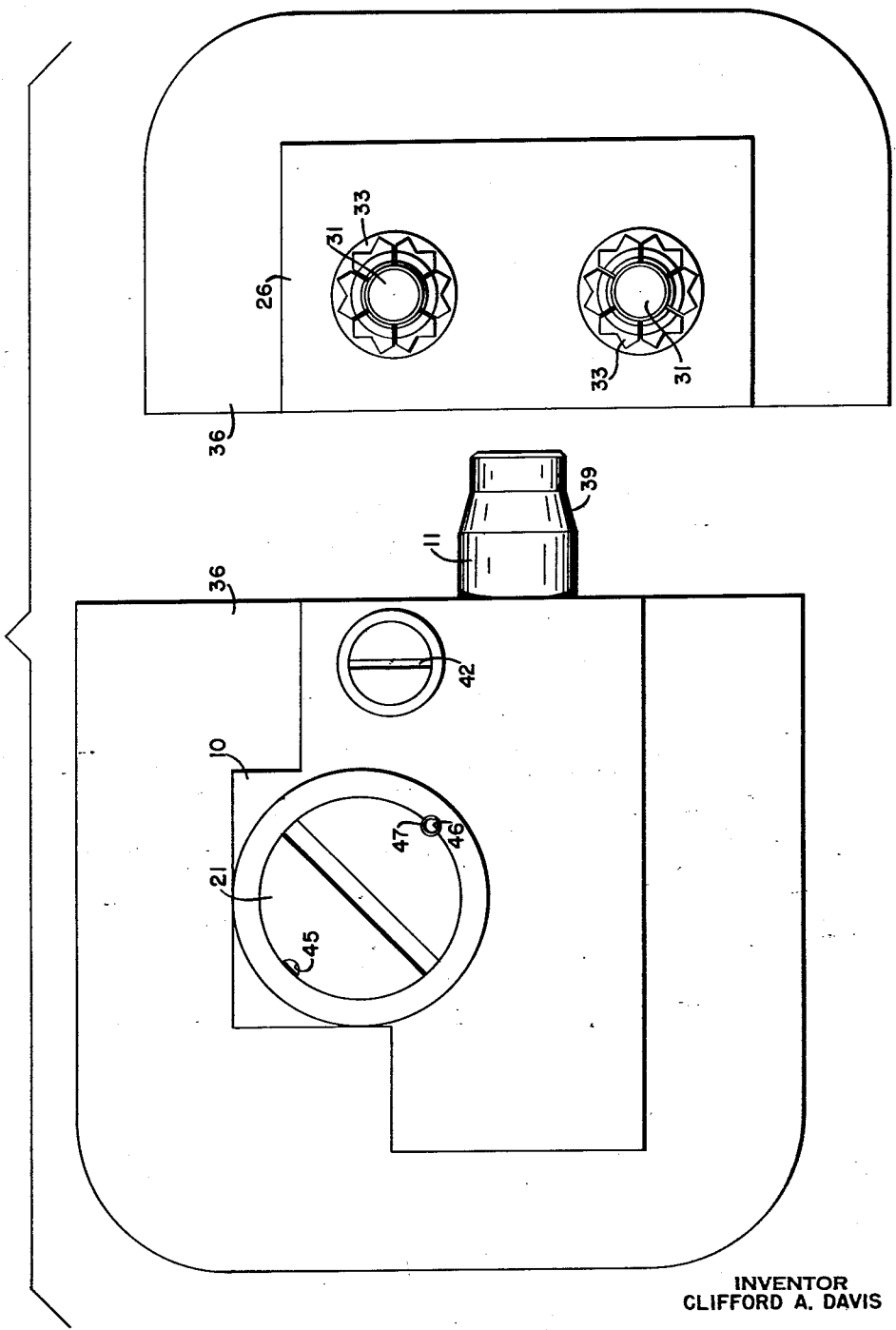
FIG. 2 is a bottom view of the embodiment of FIG. 1.

In the embodiment shown in FIGS. 1–6 it can be seen that the latch bolt unit of the invention comprises a housing 10, an elongated latch bolt 11 supported in the housing and two helical gear wheels 12 and 13. The first helical gear 12 is shown integrally formed at the inner end of latch bolt 11. This is a convenient construction but a separate gear wheel may be used. First gear 12 is arranged coaxial with bolt 11 and the bolt and gear as a unit are supported for rotation and limited axial travel.

A cylindrical shaft 14 projects inside the housing to support the first gear. As shown, the shaft is cast integrally with the housing 10. This is a convenient arrangement but a separate shaft component may be used in which case it may be appropriately welded or bolted at one end to the housing wall.

At the outer wall of the housing, there is a threaded aperture 15, coaxial with shaft 14, in which there is an annular threaded plug 16. The diameter of aperture 15 is such that the first gear 12 and latch bolt can be inserted in the housing for assembly. After assembly, the plug 16 is positioned on the end of the bolt 11 and tightened in place. The latch bolt is thus aligned and journaled inside the aperture of the annular plug.

The mounting aperture at the center of first wheel 12 is larger than the diameter of shaft 14 so that there is an annular space between the inside of the gear wheel and the outside of the shaft. This space has sufficient width for insertion of a frictional drag or brake 17. Drag 17 is formed of a suitable spring material, such as hardened steel, in a generally cylindrical shape. It has two outwardly crimped longitudinal edges 18 which project into a longitudinal keyway or slot 19 inside the mounting aperture of gear 12. In this position, the drag 17 is stressed to exert a radially inwardly directed force on the shaft. Thus any torque component exerted on first gear 12 must be greater than the friction force established between the drag and shaft 14 before the gear and latch bolt will turn. A retainer such as a snap ring shown at 20, is used in this embodiment at the end of shaft 14 to hold the drag in place axially.

The second helical gear wheel 13 is mounted in housing 10 perpendicularly of the housing surface (and the bolt axis) engaging the toothed surface of the first gear. Several arrangements are suitable for holding the second gear in place. In the arrangement shown, housing 10 has another threaded aperture in its bottom wall through which this gear is inserted during assembling. After the gear is mounted in place, a threaded plug 21 is turned into the opening where it also serves as a bearing at the end of the second gear wheel.

The length of gear wheel 13 is such that a portion of it projects through another opening on the opposite, upper wall of the housing so that it is accessible for operation at the surface of the structural members to be joined or released. The embodiment shown is also intended for flush mounting in the structural members so the upper end of gear 13 does not project above the sandwich panel or other surface. If flush mounting is not required, a square or hexagonal head may be provided at the upper end of the second gear so that it can be engaged by a tool such as a wrench.

Figure 4:
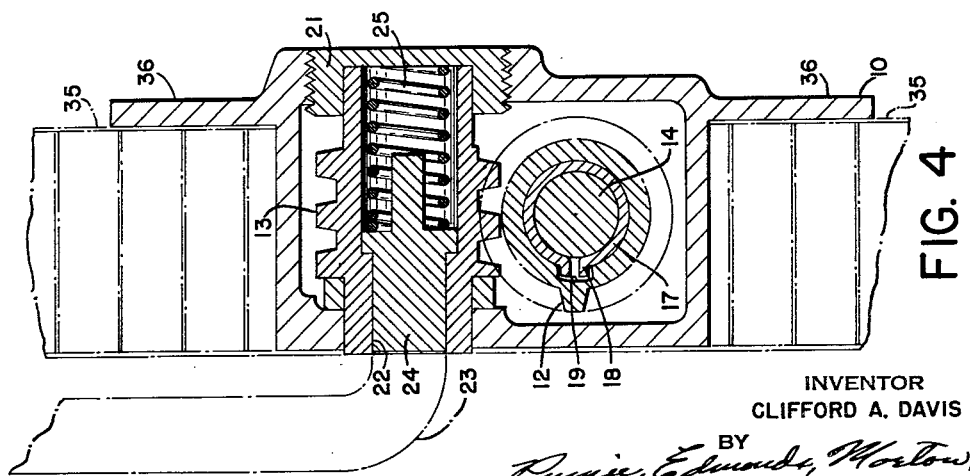
FIG. 4 is a section view taken along line 4—4 of FIG. 1 of the embodiment of FIG. 1 also showing an illustrative honeycomb panel installation.

As shown most clearly by FIG. 4, the second wheel 13 of this embodiment has an opening 22 milled into its upper end for receiving a rotating hand tool. The opening shown is shaped hexagonally and is intended for receiving a similarly shaped wrench such as is shown at 23.

Other appropriately shaped operating openings and tools may be used.

The present embodiment is also intended for applications requiring an uninterrupted smooth structure surface. Thus the central opening milled in the second gear wheel 13, as shown, extends the length of the member and is shaped to accommodate a spring loaded plug 24. A coil spring 25 is arranged bearing against plug 24 and against the bearing plug 21. When the wrench 23 is inserted, plug 24 is pushed inwardly so that the wrench is received in the gear opening 22 and the spring is stressed. When the wrench is removed the spring 25 pushes plug 24 upwardly to its normal position with its upper surface flush with the surface of the end of the gear, closing the operating opening 22.

The bushing unit of the connector comprises a housing 26 in which a threaded stud 27 is centered and supported. Several arrangements may be used to support the stud. For the housing 26 shown, note FIGS. 3 and 6, a block 28 is used. The stud element has an integral head part 29 at its inner end. The block 28 has a central opening 30 in which the stud projects when the block is inserted in the housing 26. The housing and block are drilled to receive one or more members such as a bolt 31 for holding the block in place. Thus when the stud is placed in tension, it is restrained axially from pulling out of the housing 26, by the surface of the stud head 29 bearing against the end of the block.

Figure 6:
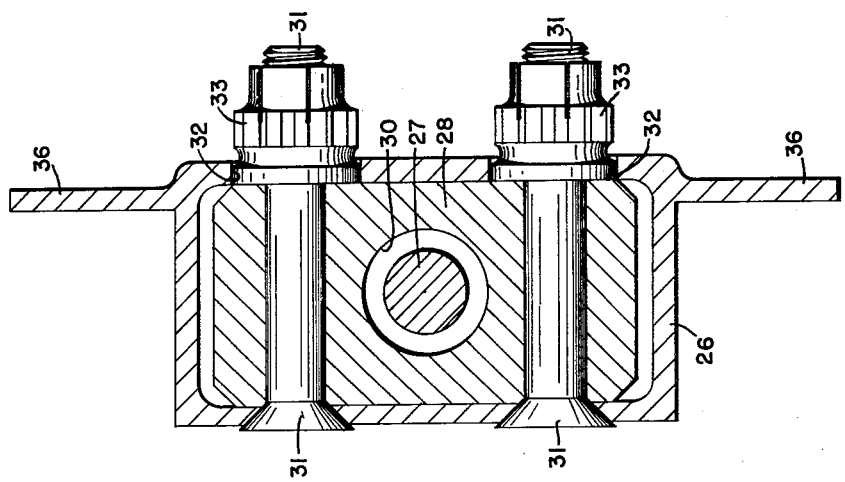
FIG. 6 is a view of the bushing unit taken along line 6—6 of FIG. 1.
Figure 5:
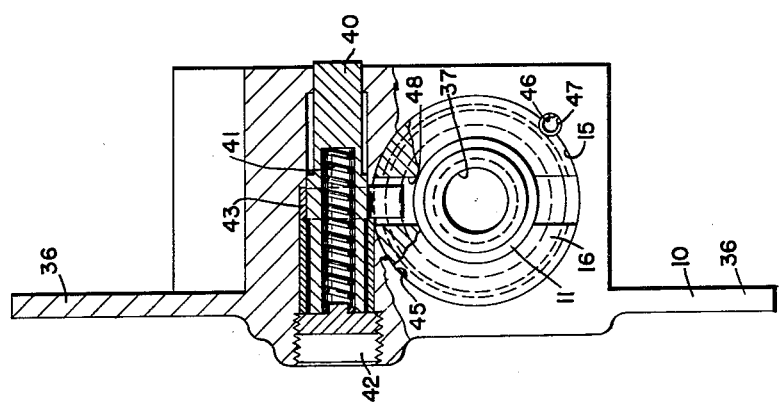
FIG. 5 is an end view partially in section of the latch bolt unit of FIG. 1.

Also shown in FIG. 6 is a circular recess 32 in the bushing housing to accommodate a round shoulder of nut 33. This is a convenient arrangement for avoiding prestressing of the housing 26. Should the thickness of the block be slightly less than the height of the housing opening, tightening of a nut 33 onto a bolt 31 holds the bolt and block in place and the nut is tightened only against the block, not against the housing. The block is solid and very strong, and the housing need not therefore be designed to support compressive forces due to tightening of the nut.

Figure 3:
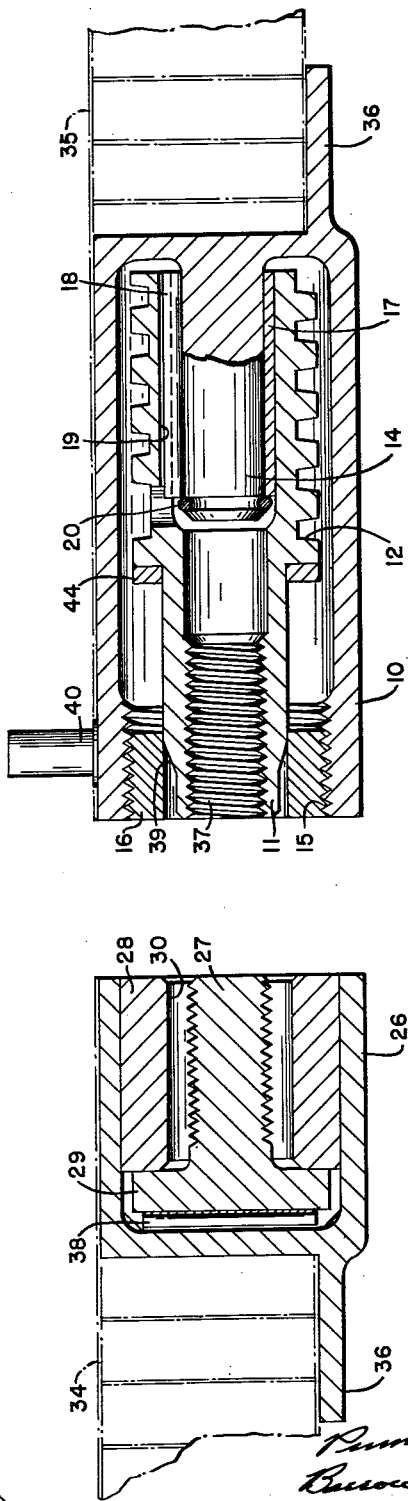
FIG. 3 is a section view taken along line 3—3 of FIG. 1 showing the embodiment of FIG. 1 with the latch bolt in the withdrawn position and illustratively installed for operation in plastic honeycomb wall panels.

In the present embodiment, each of the housings 10 and 26 has an external flange 36 on one side. By means of the flange the embodiment shown is particularly adapted for installation in, for example, plastic sandwich panels. As indicated in FIG. 3, the flange 36 extends over adjacent surface areas of panel members 34 and 35 which may be made of fiberglass or aluminum. A suitable cement is used to bond the connector units to the panels at the interfaces of the flanges 36 and the panel surfaces. Also the upper skin of the panel is bonded to the upper surfaces of housings 10 and 26. If other metallic sandwich panels are used, the flange may be brazed in place.

The broad flanges 36 and the upper surface of housings 10 and 26 of this embodiment permit stress distribution in the areas where the connector is attached to the panel members. With this feature, load forces will not rupture the panels and pull out the connectors. But the invention is not limited to this type of application and the housing configuration may be varied to be suitable for bolting, riveting, welding and the like to any type of structural members. For example, in members permitting high stress concentrations, rivets may be used through the flanges to hold the connectors in place. Or, the flanges may be eliminated and the edges of the housings welded in place.

The central aperture 30 in the bushing block has a diameter equivalent to the outside diameter of the latch bolt 11. The outer end of the latch bolt is drilled and tapped at 37 so that it can be turned and tightened onto stud 27. The two units of the connector are mounted at the desired locations in the edges of the structural members so that when the members are positioned, the latch bolt may be operated to fasten the members together.

To secure the abutting edges together, a tool is inserted in drive opening 22 in the second gear wheel 13. The tool is turned and torque is applied to the second gear wheel 13. As mentioned, the gears used are mating helical gears so that when torque is applied to second wheel 13, it in turn transmits both torque and axial thrust to the first gear 12. At the start of the fastening procedure, gear 12 is in the position shown in FIG. 3. Rotational forces on first gear 12 are resisted by a side of slot 19 striking and pulling on the rotational leading edge 18 of friction drag 17. This action slightly increases the friction at the faying surfaces of the drag 17 and shaft 14. However, this mechanism offers no resistance to axial movement of first gear 12. Consequently, when the helical driving gear 13 is rotated in the proper direction, it imparts both rotational and axial thrust forces to driven helical gear 12. The rotational force is resisted by friction drag 17 and the axial thrust force moves the first gear or driven gear 12 and latch bolt 11 axially out of housing 10 until the internally threaded end of the latch bolt meets the externally threaded stud 27.

At this stage the free axial travel of first gear 12 is halted and as the driving gear 13 is further rotated in the same direction, the rotational force it transmits to the driven gear overcomes the frictional resistance of friction drag 17 and the first gear and latch bolt start rotating. This rotation engages the internal screw threads of the latch bolt with the external screw threads of the stud 27. As rotation continues, the bolt 11 is pulled along the stud and the structural members are drawn together. In this position the outside of the latch bolt is nested in the close fitting hole 30 in the block 28. This is a strong arrangement for resisting shear loads between the fastened structural members. Tension loads between the fastened structural members are resisted by the stud 27 and latch bolt 11 being screwed together, by the head 29 of the stud resting against the inner end of block 28 and by stops provided at the end of the first gear 12 and the inner face of annular plug 16.

In the fastened or latched position slot 19 in first gear 12 is still engaged with one of the edges 18 on friction drag 17. Thus the drag acts as a deterrent to rotational motion of the driven gear 12 and latch bolt 11. This provides what is commonly called "prevailing torque locking" against accidental or inadvertent unscrewing of latch bolt 11 due to vibration, alternating stresses and the like. Upon completion of the fastening or latching operation, the actuating tool is withdrawn from drive opening 22 in second wheel 13. Spring loaded plug 24 then returns to its original position filling the hole flush with the exposed end of driving gear 13.

To unlatch or unfasten, the actuating tool is reinserted in opening 22 and the second or driving gear 13 is rotated in the opposite direction. This imparts both axial force and rotational force components to the driven gear. The directions of these components are, of course, opposite to the directions required to fasten or latch the mechanism as previously described. Because the screw threads of latch bolt 11 and stud 27 are engaged, axial movement of latch bolt is constrained. As a consequence the rotational force overcomes the resistance of drag 17 and the latch bolt starts to unscrew off of the stud. Continued rotation in the same direction separates the two parts and when the threads disengage, the constraint against axial movement of latch bolt 11 is removed. When this occurs, the friction drag stops the rotation of the latch bolt and the axial force being transmitted by second gear 13 causes the latch bolt to slide axially back into housing 10 until the inner end of gear 12 meets the wall of housing 10.

In this position, the latch bolt is withdrawn from the stud housing 26. In this embodiment, the end of the latch bolt is retracted to a position flush or slightly within the outer face of threaded plug 16. This provides a clean abutment between the two structural members so that after unfastening they can be separated in any desired direction. They may even be separated by sliding along the plane of cleavage if necessary.

The combined friction of the frictional drag 17 and of the second or driving gear 13 being forced axially against housing 10 (by spring 25 acting against plug 24) is sufficient to prevent the latch bolt from falling out of the housing due to gravity. This assures a clean abutment between the two structural members, regardless of latch orientation after unfastening.

Ability to relieve residual shear loads and to fasten structural members which are misaligned is also provided by this invention. In the embodiment shown in FIGS. 1–6, the outside diameter at the end of the latch bolt is smaller than the diameter of opening 30 in the bushing unit so that the latch bolt can be inserted even though it is not centered in the opening. The outer dimensions of the stud head 29 are also made slightly less than the dimensions of the enclosure in the bushing unit where it is positioned. With this arrangement, the stud 27 is free for limited movement in the radial directions. To keep the stud from rattling about in opening 30 when it is not threaded onto the latch bolt, it is convenient to provide a leaf spring 38 between the inner housing wall and the head 29.

Thus when the structural members are only approximately prepositioned, the stud has freedom to move to the position of the latch bolt annulus. Threaded engagement between the bolt and stud can be easily initiated and the latch bolt is drawn into the block opening as a result of the jacking action of the threads. With the outer surface of the latch bolt tapered, indicated at 39, the full diameter portion of the bolt is drawn into the block and the abutting structural members are readily aligned.

This feature is equally advantageous for unfastening when heavy shear forces are exerted on the connector by the structural members. Thus, as the bolt 11 is unthreaded, the two structural members may move relatively as the conical taper portion 39 is withdrawn from the block. The amount of residual shear relief or misalignment pickup which can be provided in one connector is determined by the difference in radii of the small outer end and the main body of latch bolt 11. The stud 27 floats radially inside the hole in the block 28 the same amount as this difference in radii, or more, if desired. Then when the connector is being unfastened or unlatched, as the latch bolt 11 is backed out of the hole 30 in the block, residual shear forces can push the stud out of alignment with the center of the hole until the small diameter of bolt 11 is resting against the side of block 28.

Where many connectors are arranged around the edges of panel or wall members, the complete action to stress relieve or to align them (during removal or replacing) would depend of course upon releasing or tightening all of the connectors. For this situation, the features just described in the connectors of the invention are particularly advantageous because by gradually releasing (or tightening) the connectors one at a time, the change in stress in each connector is small even though the total of forces acting in or on a structural member may be very large.

As mentioned above this invention also provides means for indicating the fastened condition of the connector. In the present embodiment, note FIGS. 1, 3 and 5, a pin indicator 40 is mounted in the housing 10 near to the annular threaded plug 16. Its axial disposition in the housing is perpendicular to the upper and lower surfaces of the housing. A threaded aperture is provided at the bottom of the housing so that the pin may be mounted in place. A coil spring 41 is inserted bearing against pin 40 and a threaded plug 42 holds the springs and pin from falling out. A clamp 43 is also provided around the indicator pin with its ends projecting over a slot 48 in the inner face of annular plug 16.

In the unfastened or unlatched position (as shown in FIG. 3), the pin 40 protrudes from housing 10 and the clamp is unstressed. In the fastened position however, when the connector is resisting a tension load, the latch bolt is drawn up against stops as has been described. By placing the ends of the clamp 43 between the stops as shown they are squeezed together when the connector is tightened, and the clamp is tightened around the indicator pin 40.

In the present embodiment, a washer 44 is mounted on the latch bolt 11 at the end of first helical gear 12. Its purpose is to prevent the ends of the teeth on gear wheel 12 from catching and damaging the clamp 43. Thus in the fastened position, the latch bolt stops discussed are presented by the inner face of annular plug 16 and the outer face of washer 44. If a fastened-condition indicator is not used, washer 44 is not necessary in which case the latch bolt is against stops, when extended, with the end of the gear 12 bearing against plug 16.

As indicated in FIG. 1, the ends of clamp 43 are pressed together when the washer 44 is adjacent the plug 16. The indicator pin 40 is then pushed axially against spring 41 until its outer end is flush with the surface of housing 10. Friction forces between the clamp and the pin are sufficient to hold the pin in this position as long as the clamp is not released. But when the clamp is released, the spring 41 forces the pin out of the housing so that its outer end projects above the housing 10 of the latch bolt unit, the position shown in FIG. 3.

When the pin is being held in the depressed position by the clamp, if for any reason the tension load on the connector is relaxed to the extent that the face of washer 44 moves back away from the face of the threaded plug 16, the squeeze on the ends of clamp is relaxed and the pin 40 pops up to indicate that the connector is not tight.

If the pin is then pushed back into housing 10, it will not be retained because the inside diameter of clamp 43 is too large to grip it and the force of spring 41 will again push the end of the pin outside the housing. The connector must be tightened up again before the clamp will hold the pin inside the housing.

Also shown in the drawings are pin and groove arrangements utilized for locking the annular plug 16 and the bearing plug 21 in place. When the internal components are installed in housing 10, the threaded plugs are screwed into the housing to a locking position where their faces most nearly coincide with the surface of the housing. A locking position for each is determined when a groove 45 in the plugs lines up with a groove 46 in housing 10. The lining up of two of these grooves creates a hole into which an interference fit pin or key 47 is inserted to lock the plugs against rotation. Hollow elastic keys are advantageous because they may be removed and replaced without loss of holding power. The fineness of the adjustment of plugs 16 and 21 is determined by thread pitch, the number of grooves spaced around their periphery and the relative location and number of grooves in the housing 10. In this embodiment, two grooves 45 are provided in the plugs and one groove 46 at each of the housing openings. For plug 16, this insures that one of the slots 48 in its inner face is in position to receive the ends of clamp 43.

FIG. 7 shows an alternative embodiment of the invention in which the stud cylindrical part 51 is internally threaded at 54 to engage an externally threaded latch bolt 56. For simplicity, latched-position indicator means are not shown for this embodiment but they may be incorporated.

In FIG. 7, the stud unit houses a block 50 having a central aperture 30 coaxial with the stud cylindrical part 51. The diameter of the aperture as shown is the same as the external diameter of the stud cylindrical part. In this embodiment stud head 52 is adapted to fit into the rectangular enclosure of the stud housing and the length of block 50 is such that the stud can move in the axial direction a distance equal to approximately one half of its threaded length.

In the latch bolt unit of this embodiment, the outer end of the latch bolt 56 is externally threaded for engagement in the threaded opening in the stud cylindrical part 51. The assembly opening in the latch bolt unit is threaded at 15 as before so that an annular plug 53 may be turned and tightened into the latch bolt unit after the bolt is placed in the housing 10.

Annular plug 53 in this embodiment is long enough so that its inner end surface provides a stop to limit axial travel of the bolt when the bolt has traveled a distance approximately equal to half its threaded length.

Operation of this embodiment is similar to that which has been described in connection with the embodiment above except for the axial travel features of the stud and latch bolt. In this embodiment, as the gear drive is operated, the latch bolt 56 is moved outwardly until constrained from axial movement upon engagement with the stud threads 54. Continuing rotation of the latch bolt draws the stud outwardly onto the bolt. As this happens, stud head 52 is moved away from the inner wall of housing 26 releasing the constraint against axial movement in the latch bolt but continued rotation then ejects the latch bolt sufficiently (along the drag described) to restore this restraint and pull the stud, again, further into threaded engagement. This action is actually quite smooth and progresses until the end surface of the larger diameter, helical gear portion of the latch bolt stops further bolt axial travel by engaging the inner end of plug 53.

By this time, approximately half of the threaded lengths of stud and bolt are in engagement and the stud is still in the position shown. Further rotation of the latch bolt pulls the stud into the central aperture of plug 53 and the connector is fully fastened when stud head 52 is tightened against the inner surface of block 50.

Of course, reversing the direction of rotation of the latch bolt 56 simply reverses the operation for unfastening.

The present invention has been set forth and described with reference to the details of particular embodiments. It is to be understood that many changes in the embodiments described may be made without departing from the scope of this invention. The scope of the invention is as set forth in the following claims.

I claim:

1. A connector for releasably securing two members together when said members are in predetermined abutting relation, which connector comprises: a threaded stud mounted within one of said members adjacent an edge thereof and constrained from rotational movement; a bolt movably supported within the other of said members adjacent an edge thereof; said bolt having a threaded portion at its outer end adapted for engagement with said stud; a first helical-tooth type gear wheel disposed within said other of the members coaxially of said bolt and rigidly connected to the inner end of the same; a shaft rigidly connected at one end thereof to said other of the members, said first wheel having a central longitudinal aperture therein and being mounted on said shaft, the diameter of said aperture being greater than the diameter of said shaft; a friction drag mounted in said aperture between said first wheel and said shaft, said wheel also having a longitudinal slot extending axially of said aperture, said drag being of generally cylindrical shape with the ends thereof disposed projecting radially outwardly and into said slot; and a second helical tooth-type gear wheel supported within said other of the members engaging said first wheel, said second wheel having at one end thereof means for engagement by a rotating tool.

2. A connector for releasably securing two members together when said members are in predetermined abutting relation, which connector comprises: a stud having a cylindrical threaded portion and an integral head portion at one end of said cylindrical portion, said stud being supported in an enclosure within one of said members adjacent one edge thereof, said enclosure having rigid portions mounted therein to limit axial movement of said stud, said head portion and said enclosure portions having matching angularly disposed edges for constraining said stud rotationally; a bolt mounted in an enclosure within the other of said members adjacent one edge thereof, said bolt being movably supported in said other of the members for rotation about its axis and for limited axial travel between an extended position and a withdrawn position, said bolt having a threaded outer end portion adapted for engagement with said stud threaded portion and a toothed inner end surface portion composed of a plurality of helical type gear teeth, said bolt inner end also having a generally cylindrically shaped aperture extending longitudinally therein and a slot extending longitudinally of said aperture; a cylindrical shaft rigidly connected at its inner end to said other of the members enclosure, the diameter of said shaft being smaller than the diameter of said aperture, said bolt being disposed mounted on said shaft and embracing the same at said aperture; a friction drag having a generally cylindrical shape and adjacent rdially outwardly disposed edges extending longitudinally thereof, said drag being mounted in said aperture between said bolt and said shaft with said edges projecting into said slot; and a helical tooth type gear wheel mounted within said other of the members for rotation about its axis, said wheel being disposed engaging said bolt toothed portion and having at one end thereof means for engagement by a rotating tool.

3. The apparatus of claim 2 in which said stud has a hollow internally threaded portion and said bolt outer end portion is externally threaded.

4. A connector for releasably securing two members together when said members are in predetermined abutting relation, which connector comprises: a stud having a cylindrical threaded portion and an integral head portion at one end of said cylindrical portion, said stud being supported in an enclosure within one of said members adjacent one edge thereof, said enclosure having rigid portions adjacent said head portion for constraining said stud axially, said head portion and said enclosure portions having matching angularly disposed edges for constraining said stud rotationally; a bolt mounted in an enclosure within the other of said members adjacent one edge thereof, said bolt being movably supported in said other of the members for rotation about its axis and for limited axial travel between an extended position and a withdrawn position, said bolt having a hollow internally threaded outer end portion adapted for engagement with said stud threaded portion and a toothed inner end surface portion composed of a plurality of helical type gear teeth, said bolt inner end also having a generally cylindrically shaped aperture extending longitudinally therein and a slot extending longitudinally of said aperture; a cylindrical shaft rigidly connected at its inner end to said other of the members enclosure, the diameter of said shaft being smaller than the diameter of said aperture, said bolt being disposed mounted on said shaft and embracing the same at said aperture; a friction drag having a generally cylindrical shape and adjacent radially outwardly disposed edges extending longitudinally thereof, said drag being mounted in said aperture between said bolt and said shaft with said edges projecting into said slot; and a helical tooth type gear wheel mounted within said other of the members for rotation about its axis, said wheel being disposed engaging said bolt toothed portion and having at one end thereof means for engagement by a rotating tool.

5. The apparatus of claim 4 and in which the dimensions of said stud head portion are smaller than the dimensions of said one of the members enclosure portions, said enclosure also having a cylindrical aperture coaxial of said stud threaded portion which aperture has a diameter equivalent to the outside diameter of the principal section of said bolt, said bolt having an outer end section with an outside diameter less than the diameter of the last named cylindrical aperture and a conically tapered section between said principal and outer end sections, the length of said conically tapered and outer end sections being less than the length of said stud threaded portion.

6. The apparatus of claim 4 and which further comprises: an indicator pin disposed adjacent said bolt in said other of the members and being movably supported therein for limited axial travel between a normal position and a depressed position; a coil spring disposed within said second member bearing against said pin and exerting an axially directed bias force on the same, said pin being normally disposed with a portion thereof above the surface of said other of the members; and a clamp mounted in said second member around said pin, said clamp having ends disposed projecting radially outwardly from said pin, said bolt having a radially outwardly projecting stop rigidly supported thereon and adapted to abut against an inner surface of said other of the members enclosure when said bolt is in said extended position, the ends of said clamp being disposed adjacent said inner surface between the same and said stop, said ends being held together between said stop and inner surface when the bolt is in said extended position in which position said clamp is disposed tightened against said pin restraining the same from axial movement by said bias force.

7. In a fastener for releasably securing a first member to a second and having threaded bolt and stud means adapted for mutual engagement when said members are in predetermined abutting relation, said stud means being mounted in said first member constrained from axial and rotational movement, said bolt means being movably supported in said second member for rotation about an axis and for limited axial travel between extended and withdrawn positions, said bolt means including a movable stop and said second member including a fixed stop, said movable stop being adjacent said fixed stop in said extended position for limiting said axial travel, a fastened condition indicator comprising: a pin disposed adjacent said fixed stop in said second member and being movably supported therein for limited axial travel between a normal position and a depressed position, a coil spring disposed in said second member bearing against said pin and exerting an axially directed bias force on the same, said pin being normally disposed with a portion thereof above the surface of said second member; and a clamp mounted in said second member around said pin, said clamp having ends disposed projecting radially outwardly from said pin and between said stops, said ends being pressed together between said stops when the bolt means is in said extended position in which position said clamp is stressed against said pin, the force exerted by said clamp when stressed as described being sufficient to restrain said pin from axial movement when it is in said depressed position.

8. A connector for bringing into alignment and releasably securing together two members in abutting relation when said members are initially within a predetermined range of misalignment, which connector comprises: a latch bolt unit mounted in one of said members adjacent an edge thereof, said latch bolt unit having a hollow cylindrical latch bolt movably supported therein, a shaft on which the latch bolt inner end is disposed, a drag disposed embracing said shaft between said shaft and latch bolt, the longitudinal ends of said drag being crimped outwardly for engaging said bolt, the bolt central aperture at said inner end having a longitudinal slot cut therein in which said drag ends project, helical tooth-type gear drive means disposed in said latch bolt unit engaging said latch bolt for driving the same and having means at the surface of said bolt unit for engagement with a hand tool; and a bushing unit mounted in the other of said members adjacent an edge thereof, said bushing unit having a stud supported therein constrained from axial and rotational movement, said stud having a rectangular head portion at its inner end and a threaded cylindrical portion projecting axially therefrom, a housing having a rectangular enclosure in which said head portion is disposed and a cylindrical aperture surrounding said stud threaded portion, said rectangular enclosure being slightly larger than said rectangular head portion for limiting stud radial movement, the diameter of said cylindrical aperture being equivalent to the outside diameter of said latch bolt, the outer end of said latch bolt being internally threaded for engagement with said stud threaded portion, said latch bolt outer end also having a tapered section and an end section having a diameter smaller than said cylindrical aperture diameter, the length of the threaded cylindrical portion of said stud being greater than the overall length of said end and tapered sections.

9. A connector for releasably securing two members together when said members are in predetermined abutting relation, which connector comprises: a latch bolt unit mounted in one of said members adjacent an edge thereof, said latch bolt unit having a cylindrical latch bolt movably supported therein, the latch bolt having at its inner end a cylindrical aperture extending longitudinally therein and being threaded externally at its outer end, said aperture having a slot extending longitudinally thereof, a shaft on which said latch bolt inner end is disposed, a drag disposed in said aperture between said shaft and bolt and embracing said shaft, the drag having outwardly crimped longitudinal ends which ends project into said slot, helical tooth-type gear drive means disposed in said latch bolt unit engaging said latch bolt for driving the same and having means at the surface of said bolt unit for engagement with a hand tool; and a bushing unit mounted in the other of said members adjacent an edge thereof, said bushing unit having a stud supported therein constrained from rotational movement, said stud having a rectangular head portion at its inner end and a cylindrical portion projecting axially therefrom, a housing having a rectangular enclosure in which said head portion is disposed and a cylindrical aperture surrounding said stud cylindrical portion, said cylindrical portion being hollowed and threaded internally, said internally threaded cylindrical portion and externally threaded latch bolt outer end being adapted for mutual engagement.

References Cited in the file of this patent

UNITED STATES PATENTS

| | | |
|---|---|---|
| 2,138,856 | Harp | Dec. 6, 1938 |
| 2,741,503 | Thompson | Apr. 10, 1956 |
| 2,839,322 | Kirk | June 17, 1958 |